Oct. 13, 1970  B. P. IVARSSON  3,533,131
CARCASS SPLITTING MACHINES
Filed Dec. 27, 1968

United States Patent Office 3,533,131
Patented Oct. 13, 1970

3,533,131
CARCASS SPLITTING MACHINES
Bernhard Patrik Ivarsson, Oxie, Sweden, assignor to Kontrollhudar Andelsslakteriernas Forening UPA, Malmo, Sweden
Filed Dec. 27, 1968, Ser. No. 787,403
Claims priority, application Sweden, Jan. 4, 1968, 126/68
Int. Cl. A22c 21/00
U.S. Cl. 17—23                                5 Claims

ABSTRACT OF THE DISCLOSURE

A machine for splitting animal carcasses along the backbone comprises a splitting saw movably mounted on guide means which are pivotally mounted on an axis below a conveyor path for the carcasses, whereby the splitting saw is movable between a working position and a rest position in which the carcasses or parts thereof are movable on the conveyor path past the splitting saw.

---

This invention relates to a machine mounted in a slaughter-house working station for splitting animal carcasses along the backbone, which are conveyed between different treating stations hanging in hooks from a conveyor path above the base of the working station, and a splitting saw is movable in said machine along the carcass.

In the prior art splitting machines the splitting saw is mounted on stationary guides for movement along the carcass. As the guides have a fixed position the entire splitting machine must be placed at a distance from the conveyor path. The conveyor path must have incorporated with it some type of switch permitting transfer of the carcasses to a parallel conveyor path in which means are provided for spreading the legs and for localizing the carcass opposite the splitting saw, and a further switch for returning the split carcass halves to the conveyor path proper or main conveyor path. It should be observed that the splitting machine is located in the parallel conveyor path. The disadvantages of such an arrangement particularly reside in that the machine requires considerable space with regard to both floor and ceiling surface and, because of the necessary interference in the conveyor path, results in considerably increased installation and manufacturing costs which unfavourably affect the profit gained with the splitting machine proper.

These drawbacks are eliminated by the present invention in the machine outlined above. To this end the improved carcass splitting machine is characterized by the feature that the splitting saw is located laterally of the conveyor path and is mounted for pivotal movement about a hinge disposed at or in the base of the working station to an operative position in which the splitting saw penetrates between the legs of the carcass in alignment with the backbone thereof, and from the operative position to a position of rest in which carcasses or parts of carcasses are freely movable on the conveyor path past the splitting saw.

For a better understanding, the invention will now be more fully described in the following with reference to the accompanying drawings in which.

Figure 1:
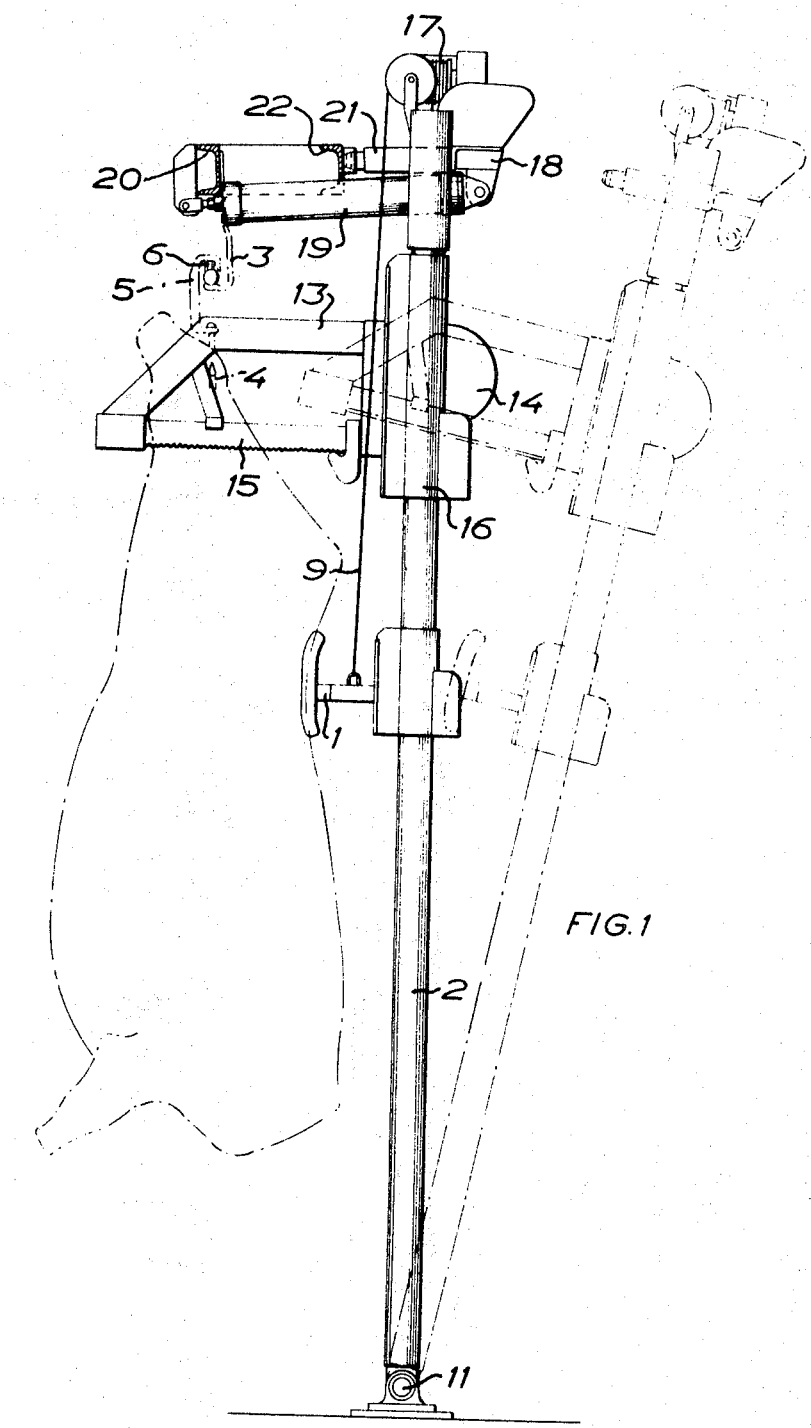
FIG. 1 is a side view of a carcass splitting machine, the rest position of the machine being shown by dash and dot lines.

In addition to the position of rest of the machine the drawings show in dash and dot lines the contours of a carcass as well as the details necessary for conveying carcasses on a conveyor path.

The machine shown in full lines occupies its operative position in which a guide means 1 is engaged with the backbone of the animal carcass and to a certain extent grasps the backbone since the guide means itself is broadly U-shaped or comprises two bars situated one on each side of the backbone. The guide means 1 extends from a pair of guides 2 which are tubular and mounted one on either side of the carcass, said guides extending from the floor surface and broadly in an upward direction beyond a conveyor path 3. The carcasses are conveyed on said conveyor path hanging by their rear legs from hooks 4 which via a suspension means 5 depend from the conveyor path proper. A roller 6 serving to facilitate shifting of the carcass is provided between the conveyor path and the suspension means 5. It should be mentioned that a hook 4, a suspension means 5 and a roller 6 are associated with each of the rear legs.

The guide means 1 is shiftable along the carcass and the guides 2 and is arranged on the guides via a transverse member 7 which extends between the guides and has its ends secured to a slide member 8. This slide member grasps the guide and will thus steer the shifting of the guide means 1 along the guides 2 and the carcass. To each end of the transverse member 7 is attached a rope 9 by which shifting of the guide means 1 is effected. The ropes 9 run from the transverse member 7 to the upper ends of the guides where they run over pulleys 10 downwards in the respective guide to a counterweight which is movable within the guide.

At the lower ends the guides 2 are secured to a shaft 11 which is mounted in bearings 12 disposed on the base. A splitting saw 13 of a per se known construction is steered along the guides 2 and comprises a motor 14 which imparts a reciprocatory movement to a saw 15 via a suitable power transmission. Steering of the saw 13 along the guides 2 takes place via slide members 16 grasping the guides. There is one guide member 16 for each guide. It should be observed that the splitting saw 13 is mounted between the slide members 16. Shifting of the splitting saw 13 along the guides 2 is effected with the aid of a rope extending from a rope drum 17 which is driven by a suitable motor. The motor and the rope drum 17 are mounted on a transverse member 18 extending between the guides 2.

A piston and cylinder unit 19 has one end hinged to said transverse member 18 and the other end secured to the frame of beams 20 of the conveyor path 3. Extending from the transverse member 18 is a buffer 21 which in the operative position shown in FIG. 1 bears against a beam 22 and thus determines the operative position of the guides 2. This determination of the operative position of the splitting machine is further facilitated by the end of the buffer 21 being to some extent frusto-conical and insertable into a sleeve means mounted on the beam 22 and having a shape conforming to the end of the buffer 21. The guides 2 will thus be guided also laterally.

In this position the splitting saw 13 penetrates between the rear legs of the carcass in front of the guides and the saw can gradually make a cut through the backbone along the path described by the guide means 1. After cutting through the carcass the splitting saw 13 and the guide means 1 are returned to the positions shown in FIG. 1, and the guides with the guide means 1 and the splitting saw 13 are swung by the piston and cylinder unit 19 to the position shown by dash and dot lines. In this position the region below the conveyor path 3 itself will thus be free so that the carcass halves can be moved on the conveyor path without interference by the splitting machine.

Figure 2:
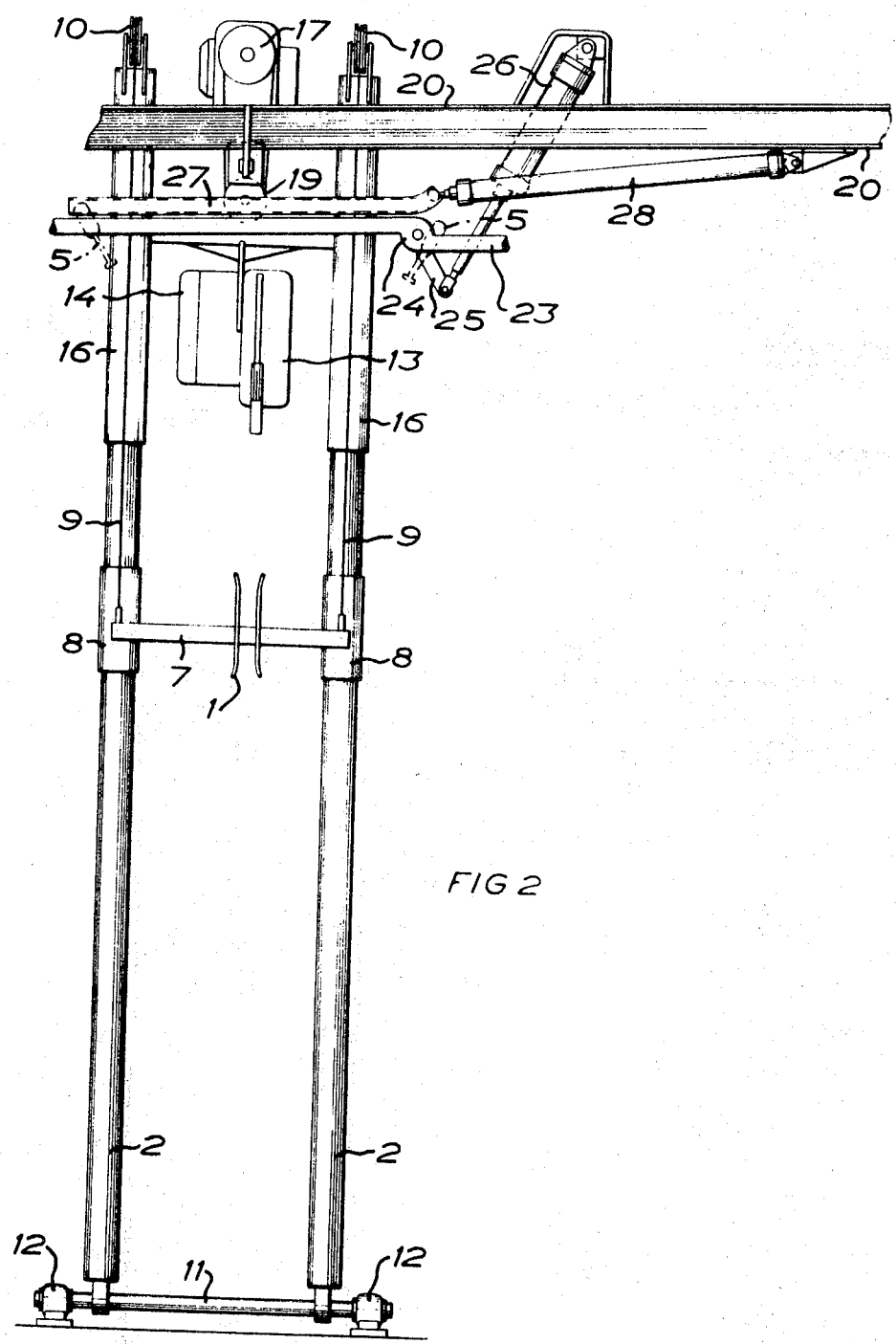
FIG. 2 is a front view of the machine.

When a new carcass is to be split it arrives at the splitting machine proper on the conveyor path 3, FIG. 2 showing merely that part 23 of said path on which the rollers 6 run. Arranged in the part or tube 23 is a bend 24 which prevents the continued advance of the carcass. A lifting means 25 is hinged to the bend 24 and the end of the lifting means remote from the bend is hinged to a piston and cylinder unit 26. The other end of the lifting means is secured in a suitable manner above the frame of beams 20. For moving the carcass in front of the splitting machine the lifting means 25 is swung counterclockwise with the aid of the piston and cylinder unit 26 for raising one hook means 4-6 past the bend 24. Thus the carcass can be moved inwardly in front of the splitting machine for as great a distance as the second hook means 4-6 allows. When the carcass is in this position it is not certain that the backbone will be situated opposite the guide means 1 and the splitting saw 13, for which reason a localizing means 27 is disposed above the tube 23. One end of a piston and cylinder unit 28 is movable along the localizing means 27 while the other end of said unit is hinged to the frame of beams 20. When the piston is moved in the unit 28 the end of the piston will move along the localizing means 27 and into engagement with the hook means 4-6 which has been lifted past the bend 24, thereby moving said hook means to the position shown to the left in FIG. 2. Thus the hook means 4-6 has been moved from some point between the guides to the position shown in the figure. This will bring about spreading of the legs of the carcass and at the same time will localize the backbone of the carcass opposite the guide means 1 and the splitting saw 13.

After this localization of the carcass the guides 2 with the guide means 1 and the splitting saw 13 are moved to the position shown in FIG. 1, whereupon the carcass can be cut through again.

The present invention thus makes it possible to place the splitting machine almost anywhere along the conveyor track 3, and the machine according to the invention will not either require any considerable floor or ceiling surface, particularly compared with the previously known splitting machines.

It should be observed in this connection that the entire splitting operation can be automated by simple and per se known means. The piston and cylinder units 19, 26 and 28 are preferably of the pneumatic type but may of course be of any other type whatever.

While the invention has been described and shown in one embodiment only, those skilled in the art will readily understand that many modifications may be resorted to within the scope of the appended claims.

What I claim and desire to secure by Letters Patent is:

1. A machine for splitting animal carcasses along the backbone, comprising means for supporting and moving said carcasses between different treating stations hanging in hooks from a conveyor path, splitting means movable along said carcass for splitting said backbone, a vertical support, said splitting means comprising a saw arranged on said support at one side of said conveyor path and means pivotally mounting said support about an axis provided below said conveyor path for movement to a working position in which said saw extends between hooked-up legs of said carcass and is aligned with said backbone, and from the working position to a rest position in which the splitting means is spaced from the carcass and the carcasses or parts of carcasses are freely movable on the conveyor path past said splitting means.

2. A machine as claimed in claim 1, wherein positioning means are provided in said conveyor path in front of said splitting saw.

3. A machine as claimed in claim 1, comprising guide means for steering and supporting said splitting saw in its movement along said carcass, said guide means being pivotal on said axis below said conveyor path.

4. A machine as claimed in claim 3, wherein said guide means are spaced from each other along said axis and wherein said splitting saw is movable along said guide means and disposed between them.

5. A machine as in claim 1, wherein positioning means are provided in said conveyor path in front of said splitting saw and include means to spread the legs of the carcass prior to the movement of the splitting saw.

References Cited

UNITED STATES PATENTS

| 556,956 | 3/1896 | Boyd | 17—23 |
| 1,116,039 | 11/1915 | Foight et al. | 17—23 |
| 1,434,440 | 11/1922 | Kundsen | 17—23 |
| 1,620,035 | 3/1927 | Paxton | 17—23 |
| 1,699,695 | 1/1929 | Feister | 17—23 |
| 3,074,102 | 1/1963 | Hotard | 17—23 |

FOREIGN PATENTS 1,282,381 12/1961 France.

ALDRICH F. MEDBERY, Primary Examiner

U.S. Cl. X.R.

17—11